US007007633B2

(12) United States Patent
Dodds

(10) Patent No.: US 7,007,633 B2
(45) Date of Patent: Mar. 7, 2006

(54) FEEDING APPARATUS FOR LIVESTOCK

(76) Inventor: William R. Dodds, 730 Dodge Ave., Suite 107, Elk River, MN (US) 55330

( * ) Notice: Subject to any disclaimer, the term of this patent is extended or adjusted under 35 U.S.C. 154(b) by 0 days.

(21) Appl. No.: 10/751,092

(22) Filed: Jan. 2, 2004

(65) Prior Publication Data

US 2004/0139919 A1    Jul. 22, 2004

Related U.S. Application Data

(60) Provisional application No. 60/437,976, filed on Jan. 3, 2003.

(51) Int. Cl.
    *A01K 5/00* (2006.01)
(52) U.S. Cl. ........................ 119/58; 119/61.1
(58) Field of Classification Search ............. 119/58, 119/60, 61.1, 61.5, 61.54, 52.4, 59, 63; 220/574, 220/574.1, 575, 608, 669, 670, 671, 672, 220/673, 674, 675
    See application file for complete search history.

(56) References Cited

U.S. PATENT DOCUMENTS

| 997,380 | A | * | 7/1911 | Eyestone .................. 119/61.1 |
|---|---|---|---|---|
| 1,252,521 | A | * | 1/1918 | Weaver ..................... 119/61.1 |
| 1,269,827 | A | * | 6/1918 | Lewis et al. ................. 119/58 |
| 1,358,484 | A | * | 11/1920 | Walters .................... 119/61.1 |
| 1,727,610 | A | * | 9/1929 | Kramer ..................... 119/61.1 |
| 2,153,455 | A | | 4/1939 | Casper et al. |
| 2,715,386 | A | * | 8/1955 | Jones ........................ 119/51.5 |
| 2,763,421 | A | * | 9/1956 | Bennett ..................... 229/406 |
| 3,004,518 | A | | 10/1961 | Struckhoff |
| 3,020,881 | A | | 2/1962 | Strom |
| 3,180,319 | A | * | 4/1965 | France et al. ............... 119/61.1 |
| 3,205,860 | A | * | 9/1965 | Moore ....................... 119/52.4 |
| 3,491,724 | A | * | 1/1970 | Sunner ..................... 119/61.54 |
| D229,073 | S | * | 11/1973 | Brickel ...................... D30/130 |
| D229,074 | S | * | 11/1973 | Cuprak ...................... D30/130 |
| D230,612 | S | | 3/1974 | Williamson et al. |
| 4,148,278 | A | * | 4/1979 | Anderson .................... 119/60 |
| 4,258,663 | A | * | 3/1981 | Schoessow .................. 119/58 |
| 4,335,679 | A | * | 6/1982 | Carlin ....................... 119/165 |
| 4,364,333 | A | | 12/1982 | Touchette |
| 4,364,335 | A | | 12/1982 | Livingston |
| 4,580,528 | A | * | 4/1986 | Kendall ...................... 119/53 |
| D286,692 | S | | 11/1986 | DePew |
| D293,948 | S | | 1/1988 | DePew |
| 4,825,588 | A | * | 5/1989 | Norman ..................... 47/66.1 |
| 5,000,122 | A | | 3/1991 | Smith |
| 5,092,273 | A | * | 3/1992 | Meyer ....................... 119/52.4 |

(Continued)

*Primary Examiner*—T. Nguyen
(74) *Attorney, Agent, or Firm*—Patterson, Thuente, Skaar & Christensen, P.A.

(57) ABSTRACT

Improved livestock feeding devices comprise a container suitable for storing feed such as, for example, hay or grain and an extension portion surrounding the container. Generally, the extension portion has a shape that defines a plurality of separate eating stations for the livestock. In some embodiments, the extension portion can be an undulating extension having a wave-like shape comprising regions of increased extension and regions of decreased extension. Due to the presence of the extension portion, livestock such as, for example, horses can be separated during feeding which reduces potential injury and/or eating interruptions that can occur when livestock use existing feeders. Additionally, the extension can have a shape adapted to collect feed that falls out of the mouth of a feeding animal, which can reduce the amount of feed that contacts the ground surrounding the feeder.

16 Claims, 9 Drawing Sheets

U.S. PATENT DOCUMENTS

| | | | |
|---|---|---|---|
| D326,742 S * | 6/1992 | Tart | D30/130 |
| 5,311,840 A * | 5/1994 | Rumbaugh | 119/60 |
| 5,323,733 A * | 6/1994 | Youngs-McVicker | 119/464 |
| 5,435,267 A | 7/1995 | Patterson | |
| D397,530 S | 8/1998 | Lile | |
| D423,735 S | 4/2000 | Lile | |
| 6,199,511 B1 | 3/2001 | Thibault | |
| D451,649 S | 12/2001 | Lovell | |
| 6,691,642 B1 * | 2/2004 | Dollahan | 119/58 |
| D495,099 S * | 8/2004 | Fort, II | D30/123 |

* cited by examiner

US 7,007,633 B2

FEEDING APPARATUS FOR LIVESTOCK

CROSS-REFERENCE TO RELATED APPLICATIONS

The current application claims the benefit of priority from U.S. provisional patent application filed on Jan. 3, 2003, entitled "Multi-Station Horse Feeder" having Ser. No. 60/437,976, which is incorporated herein by reference.

FIELD OF THE INVENTION

The invention relates to feeding devices for livestock, such as, for example, horses, cattle and the like. In particular, the invention relates to feeding devices comprising separate feeding stations for feeding hay, grain, and/or salt to multiple animals simultaneously. The invention also relates to methods of feeding livestock.

BACKGROUND OF THE INVENTION

There are a number of problems that can be associated with the current style of feeders designed to be used with livestock such as, for example, horses. Generally, existing feeders utilize a basket comprised of a series of spaced apart vertically oriented rods that retain the hay or other feed, the basket being disposed on a heavy metal stand to raise it above the ground. For example, U.S. Pat. No. 5,000,122 Smith, entitled "Horse Feeder," describes a traditional horse feeder in which U-shaped leg members support a tray above which a V-shaped hay container is fastened to hold hay.

Additionally, the top portion of existing feeders can be about six feet off the ground, which makes it very difficult to place feed into the rack without spilling some of the feed onto the ground surrounding the feeder. Existing feeder designs are not well suited to prevent feed waste since they generally do not comprise adequate trays surrounding the feed container. Consequently, as a horse, or other animal, pulls feed out of existing feeders, the feed can fall onto the ground.

Generally, it is advantageous to stop feed from falling to the ground for financial and health reasons. For example, horses tend to grind or crush feed that has fallen onto the ground, which can increase feeding costs since horses are reluctant to eat contaminated feed. Moreover, the hay and grain that falls to the ground can become mixed with feces creating a worm problem An additional issue regarding existing feeders is their weight distribution. Traditional feeders can be unstable due to the high center of gravity, which can cause the feeder to rock and/or fall over. In falling, the feeder itself can be damaged and can also injure the livestock animals that are located near the feeder. Since existing feeders are generally composed of metal, they can be heavy and difficult to move. Moreover, animals that inadvertently run into the feeders can be injured.

With the number of horses and other livestock being raised for commercial and private applications, it would be desirable to provide a livestock feeder that addresses the above limitations.

SUMMARY OF THE INVENTION

In a first aspect, the invention pertains to a feeding apparatus comprising a container having a plurality of side walls, each side wall having structure that defines at least one opening which provides access to the interior of the container, and an undulating extension surrounding the container having regions of increased extension and regions of decreased extension. In these embodiments, the extension can define a plurality of separate eating stations around the perimeter of the feeding apparatus.

In a second aspect, the invention pertains to a feeding apparatus comprising a first container section having a generally rectangular cross section, the first container section having side walls comprising a plurality of vertically oriented members. In these embodiments, the feeding apparatus can further comprise a second container section having a trapezoidal shape, the second container section having side walls comprising a plurality of vertically oriented members, wherein the second container section is connected to the first container section, and wherein the vertically oriented members define a plurality of openings that permit access to the interior of the first container section and the second container section. In these embodiments, the feeding apparatus can further comprise a extension portion that surrounds the second container section.

In addition, the invention pertains to a method for feeding livestock comprising providing a feeding apparatus, the feeding apparatus comprising a container and an undulating extension surround the container. In these embodiments, the method can further comprise placing suitable feed into the feeding apparatus and allowing one or more livestock to access separate feeding stations of the feeding apparatus.

BRIEF DESCRIPTION OF THE FIGURES

FIG. 3a is a side view of a wall section of the first section of the container.

FIG. 3b is a perspective view of the wall section of FIG. 3a.

FIG. 4a is a side view of a wall section of the second section of the container.

FIG. 4b is a perspective view of the wall section of FIG. 4a.

DETAILED DESCRIPTION OF THE INVENTION

Figure 1:
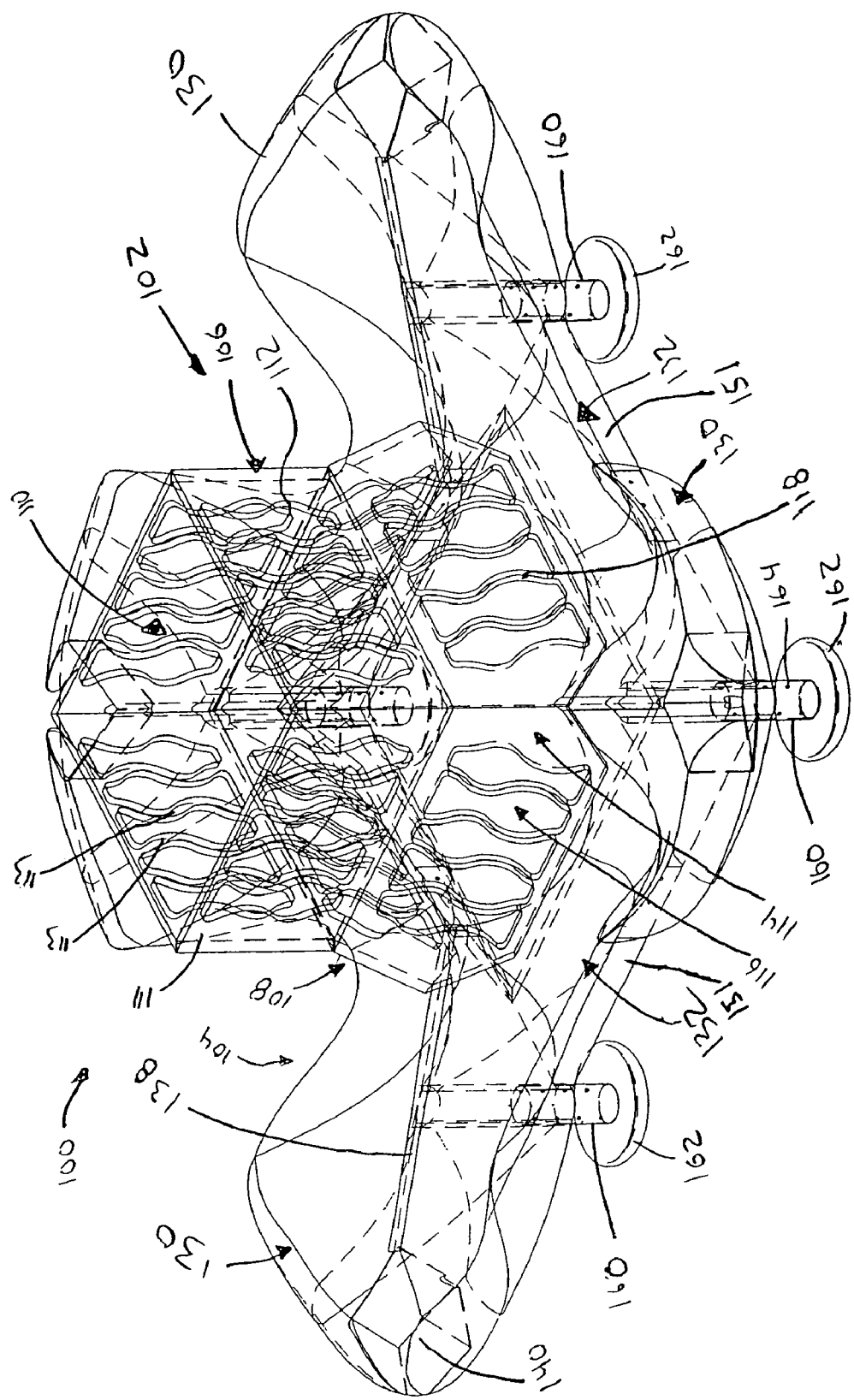
FIG. 1 is a perspective view of one embodiment of a feeding apparatus showing an extension portion surrounding the container.

Improved livestock feeding devices comprise a container suitable for storing feed such as, for example, hay or grain and an extension portion surrounding the container. Generally, the extension portion has a shape that defines a plurality of separate eating stations for the livestock. In some embodiments, the extension portion can be an undulating extension having a wave-like shape comprising regions of increased extension and regions of decreased extension. Due to the presence of the extension portion, livestock such as, for example, horses can be separated during feeding which reduces potential injury and/or eating interruptions that can occur when livestock use existing feeders. Additionally, the extension can have a shape adapted to collect feed that falls out of the mouth of a feeding animal, which can reduce the amount of feed that contacts the ground surrounding the feeder. Reducing the amount of feed that contacts the ground can reduce the expenses associated with feeding livestock, and can also reduce parasitic problems such as worms. In some embodiments, the container can comprise a first section and a second section connected to the first section. Generally, the container can comprise structure that defines at least one opening that permits access to the interior of the container, which allows horses and other livestock to access feed stored within the container. The feeder can further comprise a feed divider member located within the container that facilitates movement of the feed towards the opening(s) in the container.

As described above, several problems can be associated with existing feeders designed for feeding livestock animals, such as horses. For example, horses are grazing animals and tend to eat with their heads down. As a result, horses usually pull hay or other feed through the basket grill of existing feeders, which results in some of the feed falling to the ground surrounding the feeder. Feed that falls to the ground can become mixed with feces creating a worm problem if the contaminated feed is consumed by a horse. Furthermore, worm problems in horses can be circular, such that feces containing the parasites can be hatched in a horse's stomach, and subsequently lay additional eggs which can be re-deposited on the ground when the horse defecates. Typically, horses are dewormed every two months to ensure the health of the horses. However, reducing the amount of feed that contacts the ground reduces the chance that the horses will consume feed contaminated with feces, which permits the deworming cycle to be increased to three or four months, which can reduce the cost of the deworming process.

Additionally, it is well known that a herd of horses generally has a "hierarchy" in which a "boss" horse will take a prime eating position and force the remaining horses into an appropriate spot. Furthermore, due to the hierarchy of the herd, it is likely that lower ranking horses will not consume appropriate amounts of feed since the higher ranking horses tend to occupy the prime eating positions and/or interfere with the lower ranking horses ability to access the feeder. Thus, it is desirable to separate horses during feeding to prevent higher ranking horses from interfering with the feed consumption of the lower ranking horses. As described herein, one way of reducing the amount of feed that contacts the ground, and preventing horses, or other livestock animals, from interfering with each other during feeding is to employ a feeding apparatus comprising a container and an extension portion surrounding the container, wherein the extension portion defines a plurality of separate eating stations.

As described previously, the feeding devices of the present disclosure generally comprise a container suitable for storing feed such as, for example, hay and an extension portion surrounding the container. In some embodiments, the container comprises a first section and a second section attached to the first section. The side walls of the container can have structure which defines at least one opening that permits access to the interior of the container, which allows animals to access the feed stored within the container. In some embodiments, the openings can be designed to allow livestock such as horses to access feed from the interior of the container via the openings. Generally, the shape of the extension portion that surrounds the container defines a plurality of separate eating stations for the livestock. Furthermore, in some embodiments, the extension portion can have shape adapted to catch or collect feed that falls from an animal's mouth as the feed is pulled through the openings of the container.

In addition, the feeders of the present disclosure can be constructed of molded plastic materials, which can lower the overall weight of the feeders and can reduce the chance that an injury will occur if a horse or other animal inadvertently runs into the feeder. The molded plastic design can also reduce structural damage to the feeder, such as broken welds and the like, that can occur when existing feeders fall over. Additionally, the feeders can be very stable due to the low center of gravity and the spacing of the legs that support the feeders, which can reduce the occurrence of the feeders falling over onto livestock animals that are located near the feeders.

Figure 2:
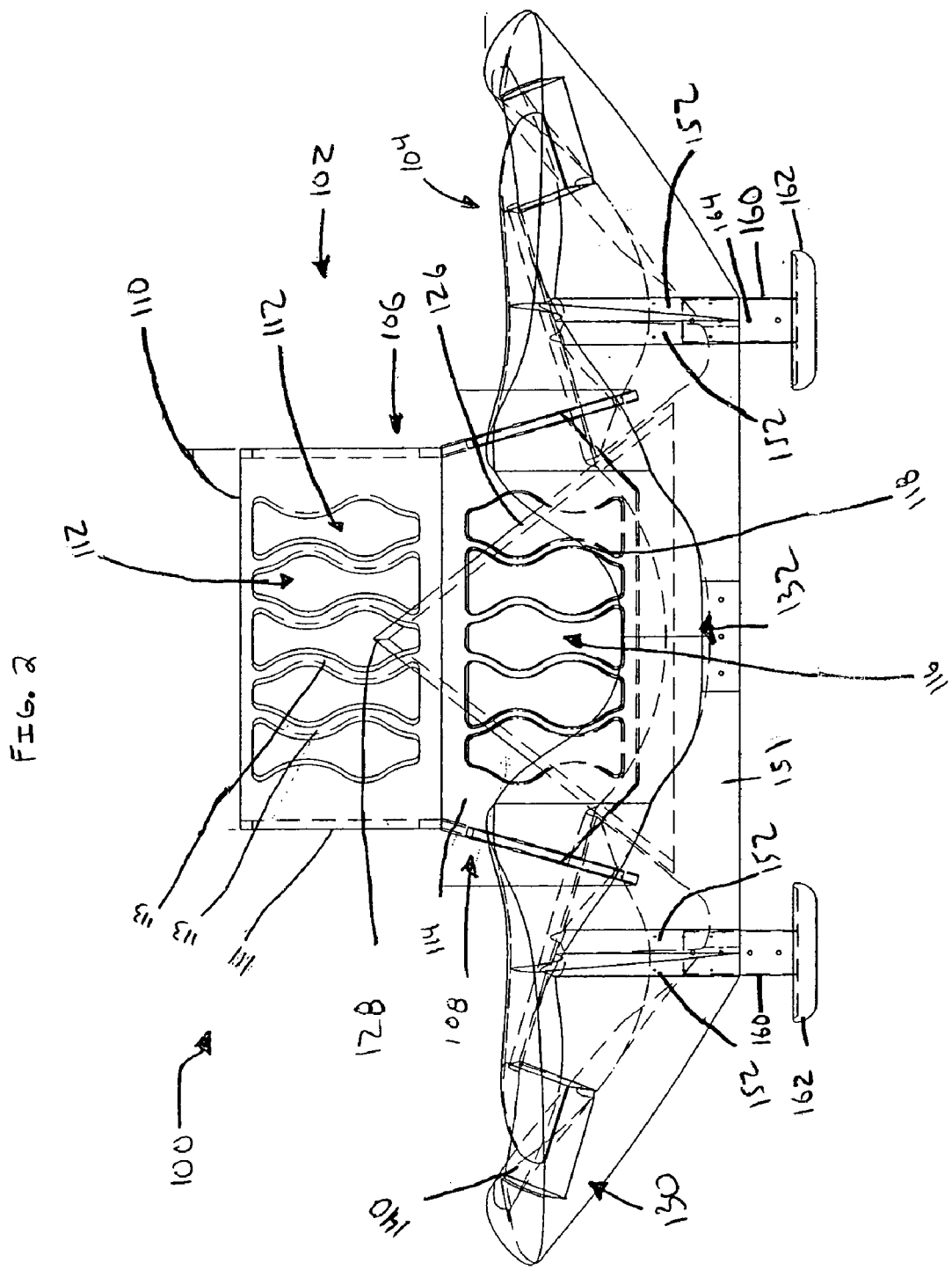
FIG. 2 is a side view of the feeding apparatus of FIG. 1, with a feed divider member located within the container shown in phantom lines.

Referring to FIGS. 1 and 2, an embodiment of a feeding device 100 is shown comprising container 102 and extension portion 104 which surrounds container 102. Container 102 is adapted to hold feed such as hay, grain and the like suitable for feeding livestock. In some embodiments, container 102 can comprise first section 106 and second section 108 which is connected to first section 106. Each section 106, 108 can comprise a plurality of side walls that are connected to enclose an interior space. Although FIGS. 1 and 2 shown an embodiment where container 102 comprises first section 106 and second section 108, embodiments exist where container 102 is a unitary structure. Additionally, the side walls of first section 106 and second section 108 can comprise structure which defines at least one opening which permits passage of feed through the side walls. In some embodiments, as shown in FIGS. 1 and 2, the side walls of first section 106 and second section 108 can comprise structure which defines a plurality of openings. One of ordinary skill in the art will recognize that no particular number of openings is required by the present disclosure, and that the size and number of openings will generally be guided by the intended application of a particular feeder. As shown in FIG. 2, a feed direction member 126 can be located within container 102 to direct feed towards the openings in the side walls of first section 106 and second section 108.

As described above, container 102 is designed to hold feed such as hay or grain suitable for feeding livestock animals. In some embodiments, container 102 can be a unitary structure having a rectangular cross section, an oval cross section, a circular cross section or the like. In other embodiments, as shown in FIGS. 1 and 2, container 102 can comprise a first section 106 connected to a second section 108 by mechanical fasteners such as, for example, clips, pins, bolts and the like. In some embodiments, first section 106 can comprise a plurality of side walls 111 connected such that an interior space is enclosed by side walls 111. In one embodiment, first section 106 can have a rectangular cross section. However, one of ordinary skill in the art will recognize that no particular cross section shape of first section 106 is required by the present disclosure, and that the cross section shape of first section 106 can be guided by the intended application of a particular feeder and the corresponding shape of second section 108. Furthermore, the size and/or volume of first section 106 can generally be guided by the intended application and corresponding size of second section 108 employed in a particular feeder design.

Figure 3:
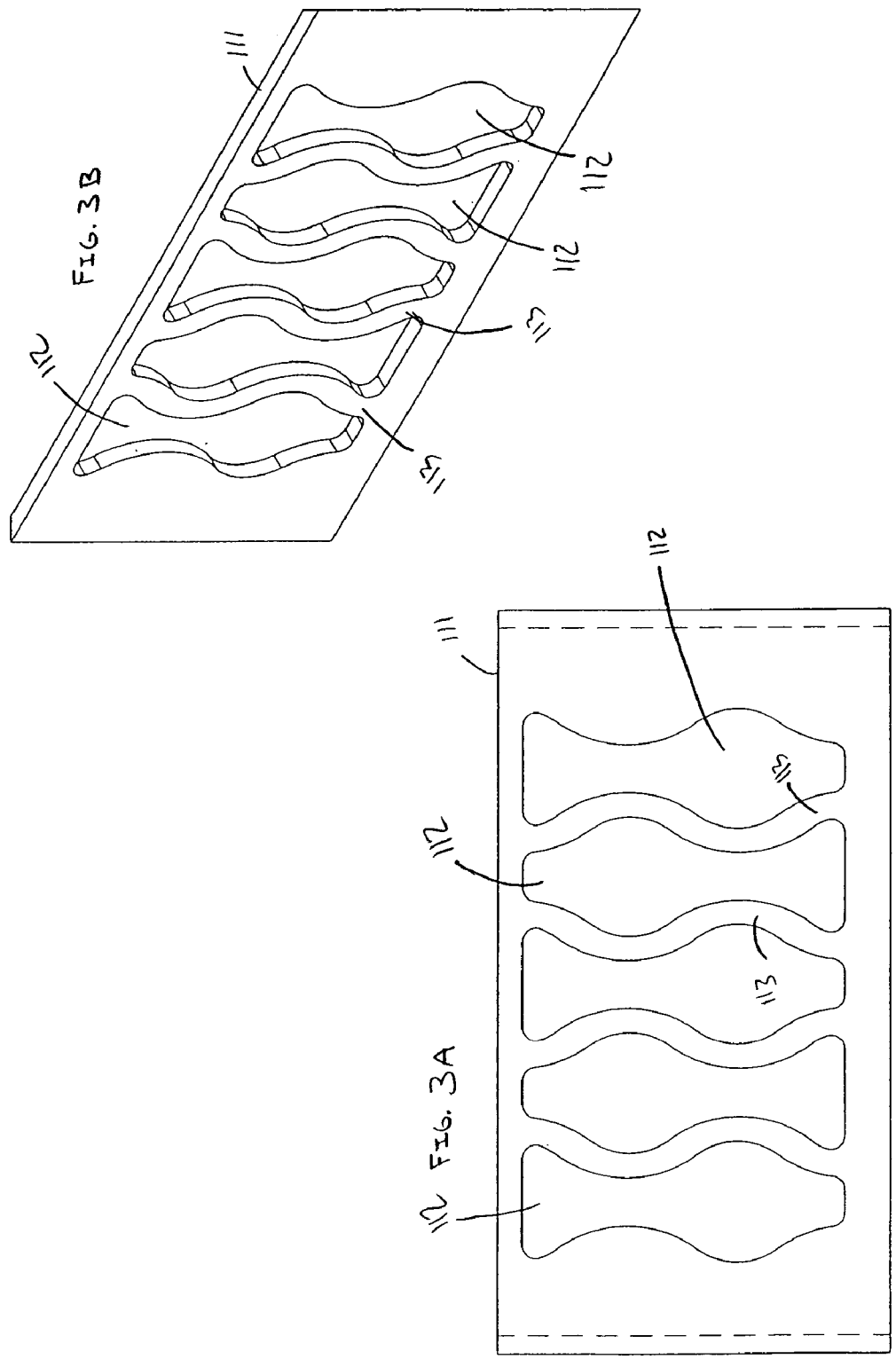

Referring to FIGS. 3a and 3b, an embodiment of side walls 111 is shown. As shown in FIGS. 3a and 3b, side walls 111 can comprise a plurality of openings 112, which allows access to the interior enclosed by first section 106. In some embodiments, openings 112 can be formed by a plurality non-linear bars 113, such that openings 112 are defined by the space between adjacent bars 113. As discussed above, openings 112 provide access to the interior of container 102, which permits an animal to access hay or other feed stored within container 102. The spacing between bars 113, and thus the size of opening(s) 112, will generally be guided by the intended application of a particular feeder. For example, a feeder designed for larger breed horses may have larger openings 112 than a feeder designed for use with smaller breed horses. Alternatively, bars 113 can be spaced such that openings 112 do not have a uniform size, which allows a single feeder to have both larger and smaller openings 112.

In some embodiments, top portion 110 of first section 106 is open to facilitate placement of feed into container 102, while in other embodiments top portion 110 of first section 106 can be closed by a lid member. The lid member can prevent water and other substances from contacting the feed stored in container 102. The size and shape of the lid member will generally be guided by the cross sectional size and shape of first section 106. Generally, the lid member can be hingedly coupled to first section 102, such that the lid may be opened and closed to allow access into the interior of container 102. Additionally, in some embodiments, a handle can be attached to the lid member to facilitate opening and closing of the lid member.

In some embodiments, container 102 can comprise first section 106 connected to second section 108. As shown in FIGS. 1 and 2, in some embodiments, second section 108 can have a trapezoidal or pyramidal shape, however, one of ordinary skill in the art will recognize that no particular shape of second section 108 is required by the present disclosure. The trapezoidal shape of second section 108 provides a larger base for container 102 and helps stabilize the container. Furthermore, as described below, the trapezoidal or pyramidal shape of container 102 permits a pyramidal feed divider to be located within second section 108. In some embodiments, second section 108 can be formed by a plurality of side walls 114 which can be connected to enclose an interior space. The size and/or volume of second section 108 will generally be guided by the intended application and corresponding size of first section 106 employed in a particular feeder design.

Figure 4:
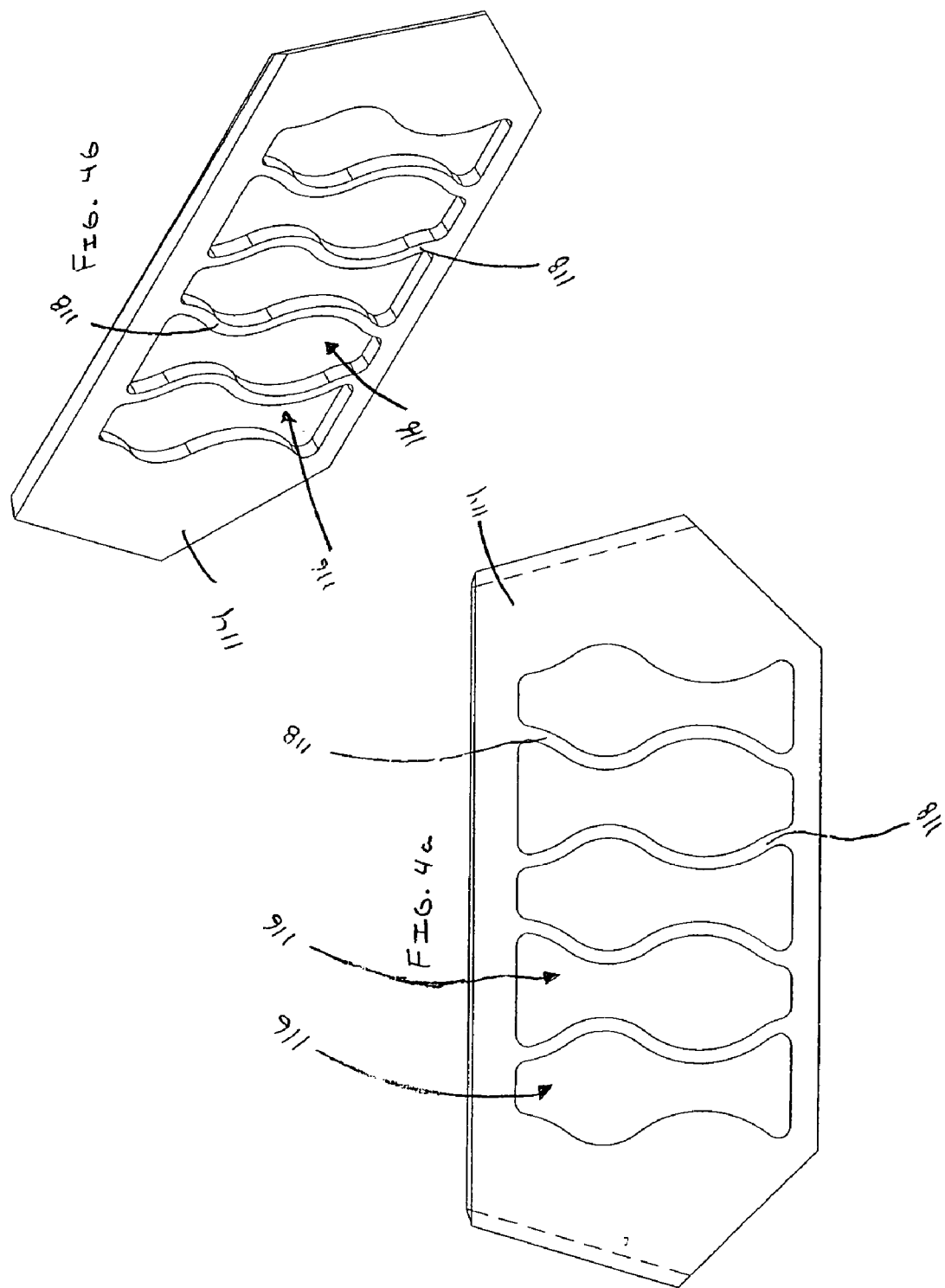

Referring to FIGS. 4a and 4b, an embodiment of side walls 114 is shown having a plurality of openings 116. In some embodiments, openings 116 can be formed by a plurality of non-linear bars 118, such that openings 116 are defined by the space between adjacent bars 118. Openings 116 provide access to the interior space of second section 108, which permits livestock animals to access the feed stored within second section 108. The size of openings 116 will generally be guided by the intended application of a particular feeder, and no particular size openings 116 are required by the present disclosure. In some embodiments, openings 116 in second section 108 can have substantially the same dimensions as openings 112 in first section 106, while in other embodiments openings 116 and openings 112 can have different dimensions.

Figure 5:
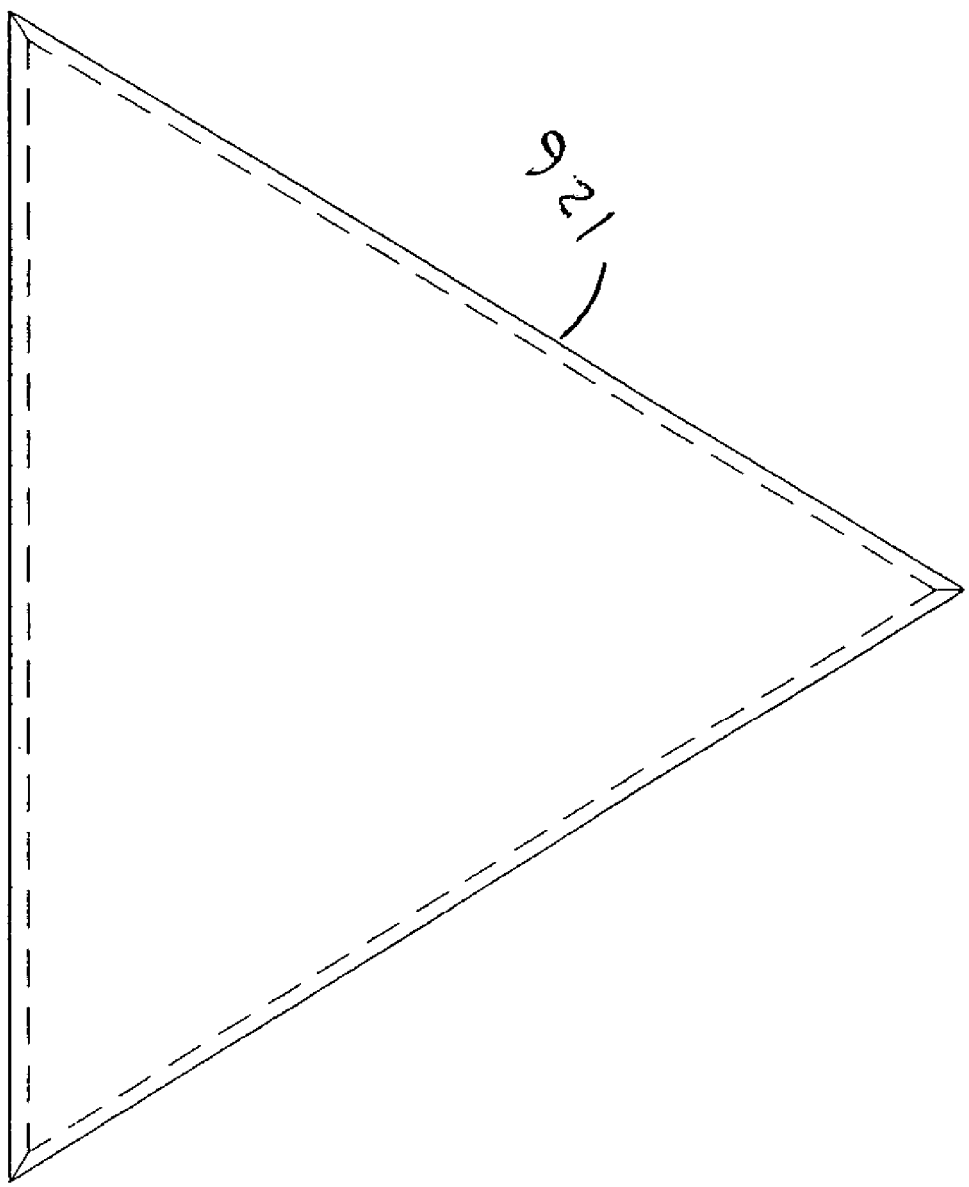
FIG. 5 is a side view of an embodiment of a feed divider member.

In some embodiments, container 102 can further comprise a feed direction member 126 located in the lower portion of second section 108. Feed direction member can be any structure suitable for directing hay or other feed towards the openings in first section 106 and second section 108. In some embodiments, as shown in FIGS. 2 and 5, feed direction member 126 can comprise a pyramid shaped member which can be aligned such that tip 128 is pointing towards top portion 110 of first section 106. In other embodiments, feed direction member can comprise a cone structure or the like. One of ordinary skill in the art will recognize that additional shapes of feed direction member 126 are contemplated and are within the scope of the present disclosure. Due to the presence of the feed direction member, feed placed into container 102 through top portion 110 of container 102 can contact feed direction member 128, which can push or direct the feed towards the openings in first section 106 and second section 108 of container 102.

As described above, the feeders of the present disclosure generally comprise an extension portion 104 which surrounds the lower portion of container 102. In some embodiments, extension portion 104 has structure which defines a plurality of separate eating stations for livestock. Additionally, extension portion 104 can also have structure adapted to collect feed that that falls out of an animals mouth during feeding. In some embodiments, extension portion 104 can comprise a unitary structure, while in other embodiments extension portion 104 can comprises a plurality of component pieces that can be assembled to form the extension portion. In some embodiments, extension portion 104 can be an undulating extension having a wave-like shape comprising alternating regions of increased extension 130 and regions of decreased extension 132. In particular, in one embodiment, the undulating extension can be formed by connecting a plurality of U shaped petals, such that an extension portion having regions of increased extension and regions of decreased extension is formed. Since the regions of decreased extension 132 are in between regions of increased extension 130, the regions of decreased extension 130 can provide a plurality of separate eating stations for livestock. As shown in FIGS. 1 and 2, feeder 100 comprises four regions of decreased extension 132, or four separate eating stations. However, one of ordinary skill in the art will recognize that embodiments with additional eating stations are contemplated and are within the scope of the present disclosure.

Figure 6:
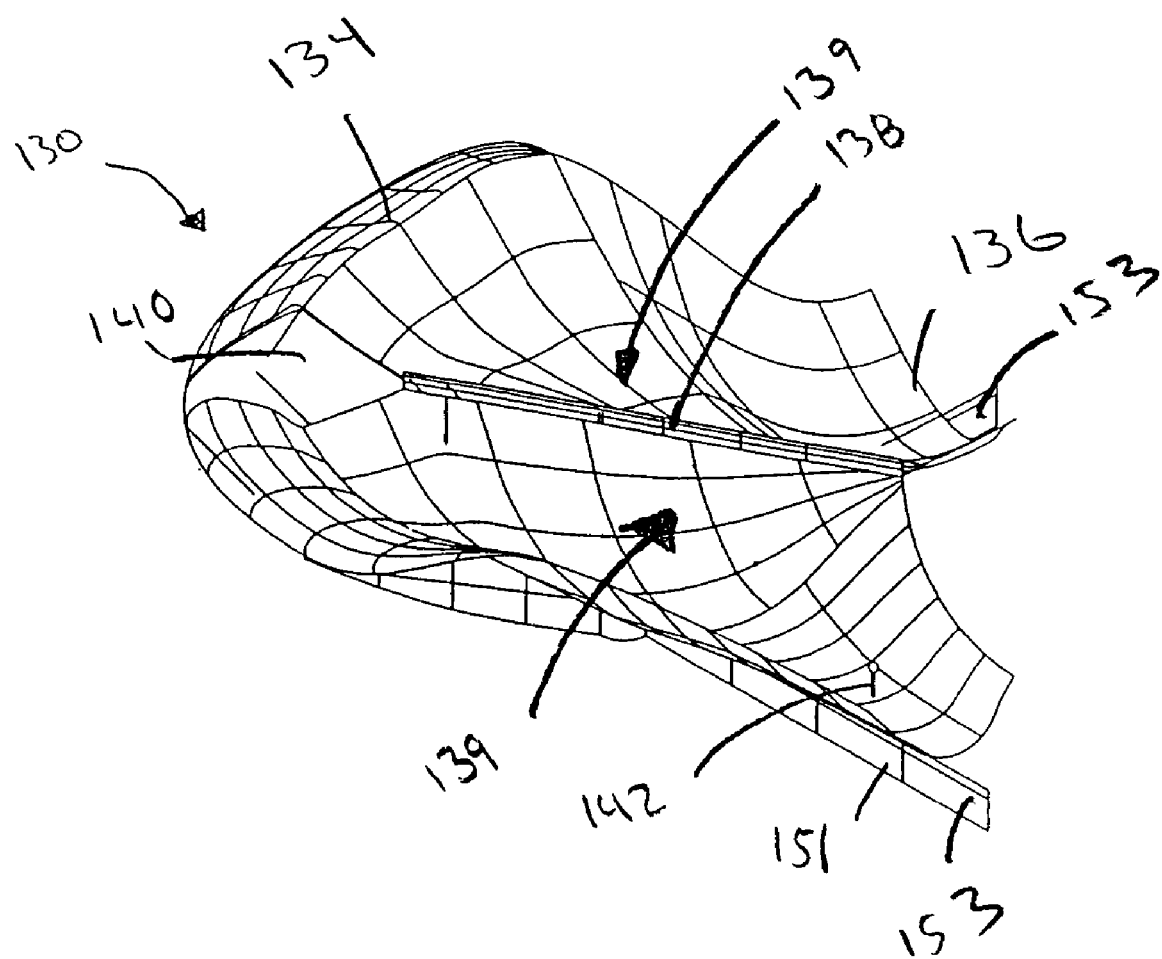
FIG. 6 is perspective view of a region of increased extension of the extension portion.

Referring to FIG. 6, the regions of increased extension 130 can comprise an outboard end 134 and an inboard end 136 adjacent to container 102. In some embodiments, outboard end 134 can be positioned higher than inboard end 136. The increased height of outboard end 134 relative to inboard end 136 can function to separate the animals in adjacent eating stations, thus preventing adjacent animals from interfering with each other during feeding. Additionally, the increased height of outboard end 134 can facilitate the collection of feed that has fallen into the extension portion towards the inboard end 136. In some embodiments, outboard end 134 can be from about 0.5 feet to about 4 feet higher than inboard end 136, while in other embodiments outboard end 134 can be from about 1 foot to about 2.5 feet higher than inboard end 136. One of ordinary skill in the art will recognize that additional ranges of the height of outboard end relative to inboard end within these explicit ranges are contemplated and are within the scope of the present disclosure. Additionally, in some embodiments, the center section 138 of each region of increased extension 130 can run generally parallel to the ground, while the sides 139 can slope vertically to form a trough-like shape. The trough-like shape functions to collect feed that falls out of animals mouth during use of the feeder.

Figure 7:
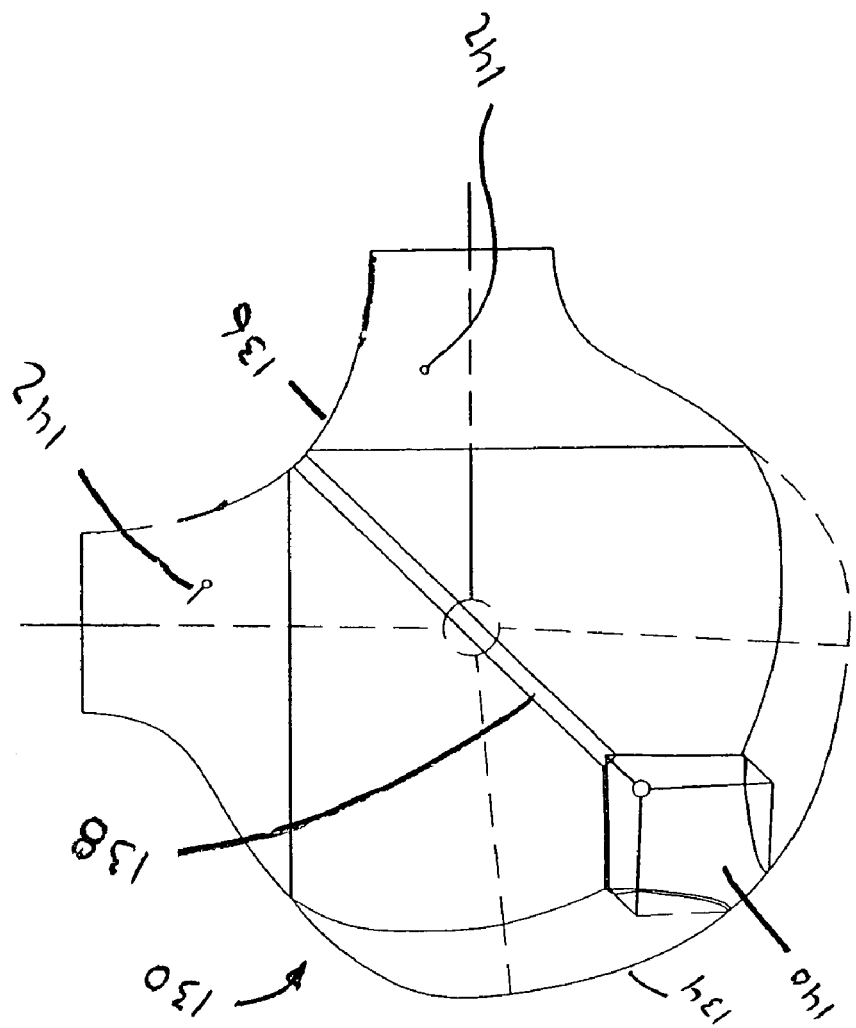
FIG. 7 is a top view of a region of increased extension.

Referring to FIGS. 6 and 7, an embodiment of a region of increased extension 130 is shown comprising indentation 140 located near outboard end 134. Indentation 140 can have dimensions designed to accommodate, for example, a salt block or the like. Additionally, the regions of increased extension 130 can further comprise one or more drains 142 which facilitate drainage of water and other liquids that may accumulate in extension portion 104. In some embodiments, drains 142 can comprise a keyhole structure having a larger top opening and a slot extending down towards the base of the trough and intersecting the trough at the lowest point. The keyhole drain design permits water to seep through the slot portion of the drain during lighter rains, while the larger top opening permits larger amounts of water to exit the extension portion 104 during heavier rains. Additionally, the keyhole drain allows water to drain out of the extension portion 104 without allowing significant portions feed to escape. Additionally or alternatively, the extension portion 104 can be provided with one or more drains comprising an opening covered by a mesh screen, which allows water to drain from the extension portion 104 while also preventing hay or other feed from leaving the extension portion.

Figure 8:
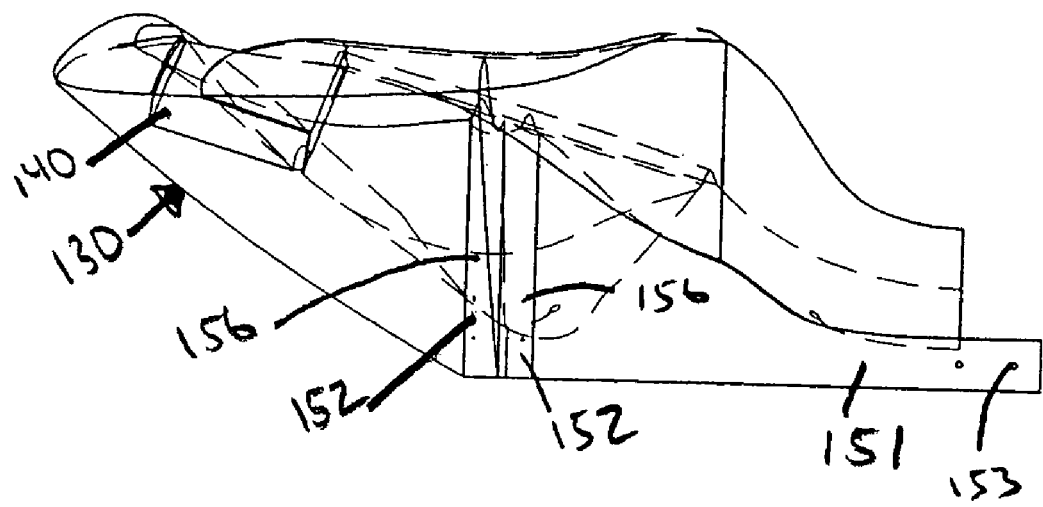
FIG. 8 is a side view of a region of increased extension.

Referring to FIGS. 1, 2, and 8, feeder 100 can be supported by a truss system. Generally, the truss system can be any mechanical structure suitable for supporting container 102 and extension portion 104. In one embodiment, truss system can comprise a plurality of support beams 151, wherein each support beam 151 has preformed holes 153 which facilitate connection of one support beam to an adjacent support beam. Generally, adjacent supporting beams 151 can be connected by, for example, a bolt and spring clip which can be inserted through holes 153 to form a support structure. As shown in FIGS. 1 and 2, support beams 151 can be connected to form a rectangular support shape which supports container 102, extension portion 104 and feed divider member 126. In some embodiments, additional strength at the connection point between adjacent beams may be required. In these embodiments, a metal plate can be coupled to the connection point to reinforce the connection of adjacent support beams. Additionally, the truss system can further comprise one or more extending arms 152 which extend from support beams 151 to the regions of increased extension 130, and function to support the regions of increased extension 130. Extending arms can further comprise a plurality of holes 156 which can align with holes on the supports legs for securing the support legs to extending arms 152 of the truss system.

Figure 9:
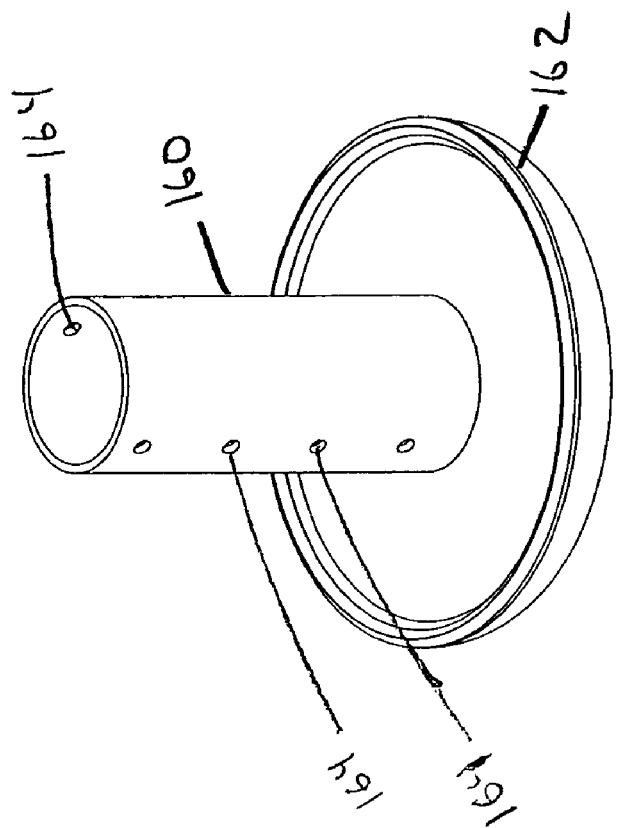
FIG. 9 is a perspective view of a support leg having a base portion attached thereto.
Figure 10:
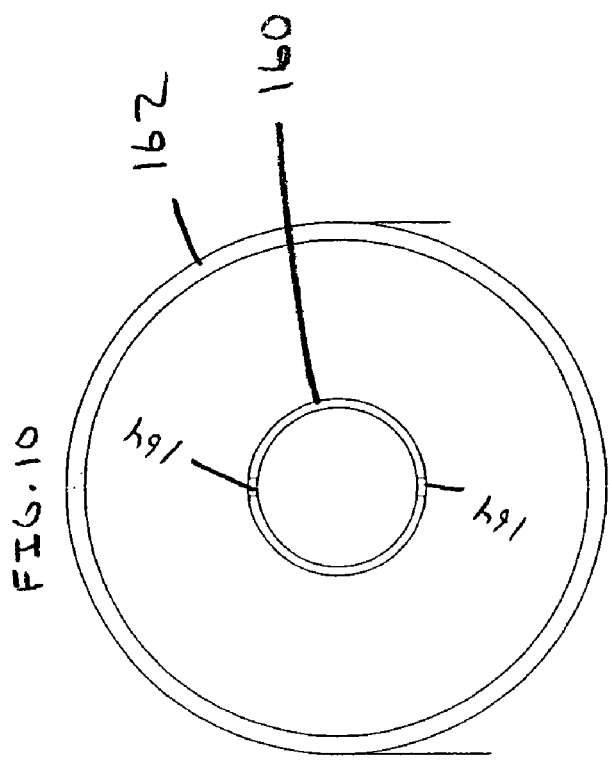
FIG. 10 is a top view of the support leg and attached base portion of FIG. 9.

Referring to FIGS. 9 and 10, an embodiment of a support leg 160 and base portion 162 is shown. As shown in FIG. 9, support leg 160 can be a generally tubular structure having a circular cross section, an oval cross section or the like. One of ordinary skill in the art will recognize that additional cross sectional shapes of support leg 160 are contemplated and are within the scope of the present disclosure. In some embodiments, base portion 162 is connected to support leg 160 to permit feeder 100 to slide across a surface. In one embodiment, base portion 162 can comprise a mushroom shape having a rounded surface which contacts the ground and allows the feeder to slide along the ground. Additionally, support leg 160 can comprise a plurality of vertically spaced holes 164 with can align with corresponding holes 156 located on extending arms 152. Support leg 160 can be attached to extending arms 152 by aligning the desired holes 164, 156 and securing support leg 160 to extending arms 152 with, for example, a cotter pin. The plurality of vertically spaced holes 164 on support leg 160 and the plurality of holes 156 on extending arms 152 allow the overall height of the support leg 160, and therefore the height of feeder 100, to be adjustable. Thus, the height of feeder 100 can be adjusted to accommodate different types of animals or different breeds of a particular animal.

The container, extension portion, support legs and base portions, can be formed from polymers. Suitable polymers include, for example, polyethylene, ultra high molecular weigh polyethylene (UHMWPE), poly(propylene), poly(vinyl chloride), poly(tetrafluoroethylene), polycarbonates, and blends and copolymers thereof. In some embodiments, the component pieces of the feeder can be injection molded and then assembled to form the feeding apparatus. The support beams of the truss system can be formed from any material suitable for use as a support system. Suitable materials include metals, polymers and combinations thereof.

In embodiments where the undulating extension is formed by a plurality of U shaped petals, the feeder can be assemble by attaching the leg supports to the extending arms. The legs can be set to a desired height by inserting, for example, a metal bolt and spring clip into the desired holes formed in the leg supports and the extending arms. The plurality of U shaped petals can be positioned adjacent one another in order to form the approximate shape of the undulating extension. In some embodiments, the truss system can be connected to the U shaped extension petals, and the holes in the support beam of one petal can be aligned with the holes in a support beam of an adjacent petal. Metal bolts and spring clips can then be inserted to secure one support beam to the adjacent support beam, which forms the completed extension portion.

In some embodiments, the feed divider member can be adapted to fit over the corners of the U shaped petals. In these embodiments, assembly of the feeder can further comprise placing the feed divider member over the corners of the U shaped petals. In embodiments where the container comprises a first section and a second section, the first section can be connected to the second section by metal brackets, bolts and spring clips and the completed container can be positioned over the feed divider member. In one embodiment, the container can straddle the U shaped petals at each corner, with gravity holding the container in place. In other embodiments, the feed divider member and/or the container may fastened to the extension portion by bolts, fasteners, clips and the like.

Once assembled, feed such as hay or grain can be loaded into feeder through the top portion of the container. As noted above, the feed direction member can facilitate the movement of the feed towards the openings located in the container. Livestock animals such as horses and the like can then be permitted to access the feeder. The animals can access the feeder by assuming a position in one of the plurality of separate eating stations defined by the extension portion. Once in an eating station, an animal can access feed stored in the container by pulling the feed through one of the openings located on the walls of the container.

The embodiments above are intended to be illustrative and not limiting. Additional embodiments are within the claims. Although the present invention has been described with reference to particular embodiments, workers skilled in the art will recognize that additional changes may be made in form and detail without departing from the spirit and scope of the invention.

The invention claimed is:

1. A feeding apparatus comprising:
 a container capable of presenting feed to one or more livestock animals; and
 an extension supporting the container having a base and an undulating perimeter, said undulating perimeter comprising regions of increased radial extension and regions of decreased radial extension relative to the container, wherein the undulating perimeter of the regions of increased radial extension are elevated relative to a base of the container to divide the extension into a plurality of separate eating stations, and wherein the undulating perimeter of the regions of decreased radial extension includes a dip portion, said dip portion lower than the undulating perimeter of the regions of increased radial extension so as to facilitate access to the container, wherein said base in the regions of increased radial extension slopes downwardly towards the regions of decreased radial extension.

2. The feeding apparatus of claim 1 wherein the container further comprises a first section supported by a second section.

3. The feeding apparatus of claim 2 wherein the first section has a rectangular cross section.

4. The feeding apparatus of claim 2 wherein the second section has a trapezoidal shape.

5. The feeding apparatus of claim 2 wherein the first section and the second section each comprise a plurality of side walls, wherein each of the plurality of side walls has structure which defines a plurality of openings.

6. The feeding apparatus of claim 1 wherein the container further comprises a feed divider member located within the container for directing feed towards the openings in the plurality of side walls in the container.

7. The feeding apparatus of claim 1 wherein the undulating perimeter of the regions of increased radial extension are from about 0.5 feet to about 4 feet higher than the dip portion.

8. The feeding apparatus of claim 1 wherein regions of increased radial extension can further comprise a central section that runs generally parallel to the ground.

9. The feeding apparatus of claim 8 wherein the central section has a pair of side members that slope to form a trough-like shape.

10. The feeding apparatus of claim 1 wherein the regions of increased radial extension comprise one or more drains suitable for draining liquid from the regions of increased extension.

11. The feeding apparatus of claim 10 wherein the drain comprises a keyhole shape having larger upper opening and a slot extending from the upper opening.

12. The feeding apparatus of claim 1 wherein the feeding device is supported by a truss system.

13. The feeding apparatus of claim 12 wherein a plurality of support legs are attached to the truss system to support the feeding apparatus.

14. The feeding apparatus of claim 13 wherein each of the plurality of support legs are connected to a base portion suitable for permitting the feeding apparatus to slide over a surface.

15. Feeding apparatus of claim 14 wherein the base portion comprises a mushroom shape.

16. The feeding apparatus of claim 1 wherein the extension is formed by connecting a plurality of U shaped petals.

* * * * *

UNITED STATES PATENT AND TRADEMARK OFFICE
CERTIFICATE OF CORRECTION

| | | |
|---|---|---|
| PATENT NO. | : 7,007,633 B2 | Page 1 of 1 |
| APPLICATION NO. | : 10/751092 | |
| DATED | : March 7, 2006 | |
| INVENTOR(S) | : William R. Dodds | |

It is certified that error appears in the above-identified patent and that said Letters Patent is hereby corrected as shown below:

Column 1, Line 47:

After "problem" insert a period.

Column 2, Line 29:

Delete "FIGUES" and insert --FIGURES--.

Signed and Sealed this

Fifth Day of June, 2007

JON W. DUDAS
*Director of the United States Patent and Trademark Office*